May 27, 1952     B. HOOZ ET AL     2,598,168
ADDITIONAL WHEEL ATTACHMENT FOR TWO-WHEEL HAND TRUCKS
Filed May 19, 1947     2 SHEETS—SHEET 1
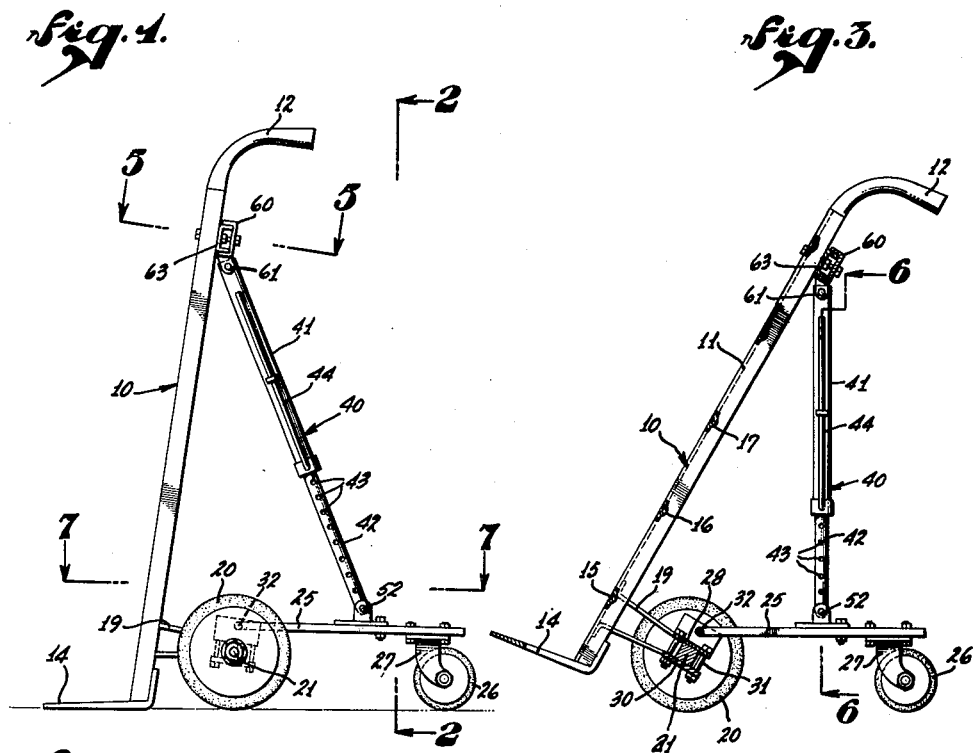
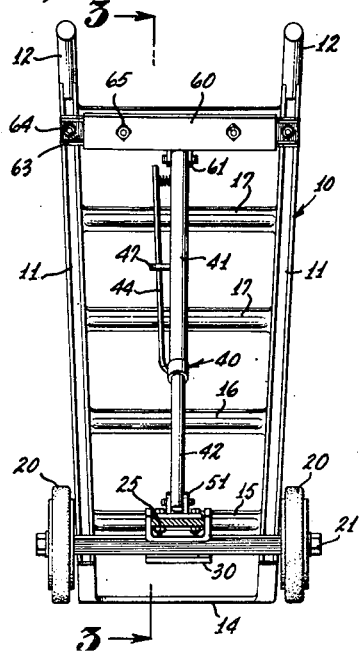
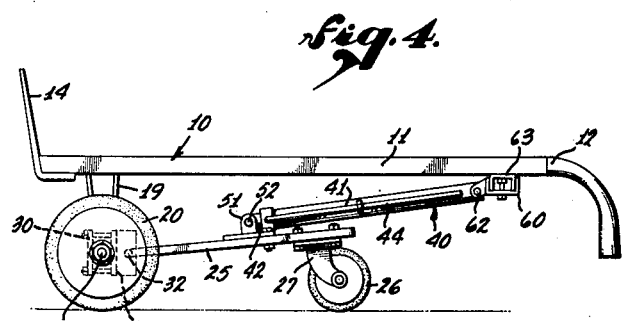
INVENTORS:
BENJAMIN HOOZ
BY SAMUEL T. MELLO
Huebner, Maltby
and Beehler
ATTORNEYS.

May 27, 1952 B. HOOZ ET AL 2,598,168
ADDITIONAL WHEEL ATTACHMENT FOR TWO-WHEEL HAND TRUCKS
Filed May 19, 1947 2 SHEETS—SHEET 2
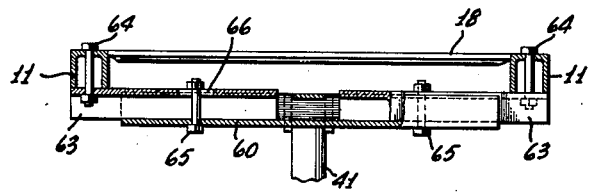
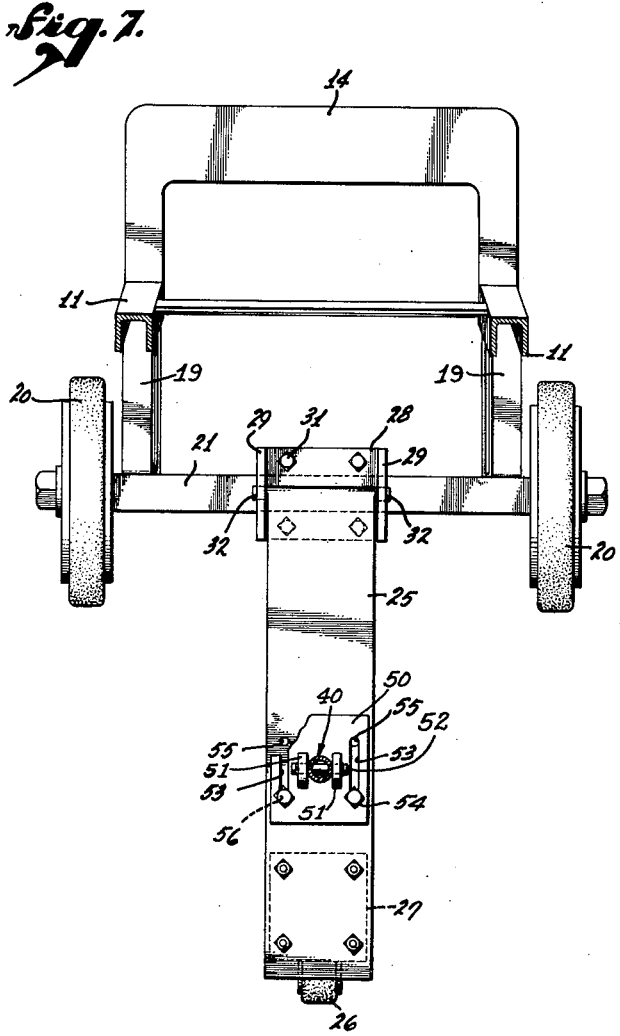
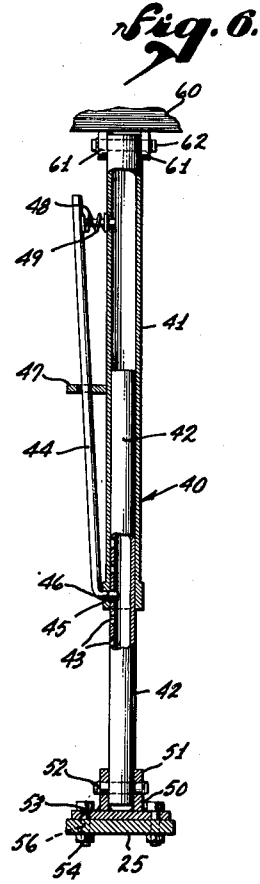
INVENTORS:
BENJAMIN HOOZ
SAMUEL T. MELLO
BY Huebner, Maltby
and Beehler
ATTORNEYS.

Patented May 27, 1952

2,598,168

UNITED STATES PATENT OFFICE 2,598,168

ADDITIONAL WHEEL ATTACHMENT FOR TWO-WHEEL HAND TRUCKS

Benjamin Hooz, Los Angeles, and Samuel T. Mello, Bell Gardens, Calif.; said Mello assignor to said Hooz Application May 19, 1947, Serial No. 748,944

6 Claims. (Cl. 280—54)

The invention relates to an attachment which can be affixed to any one of a great variety of commercial hand trucks and which will improve the usefulness and safety of the truck.

Among the objects of the invention, therefore, is to provide a new and improved hand truck attachment which increases the stability of an ordinary hand truck when used for its designated purpose and which greatly improves the safety of the hand truck where particularly heavy loads are encountered.

Another object of the invention is to provide a new and improved attachment for a conventional hand truck which is so designed and constructed that it may be adapted to fit virtually any type or size of hand truck.

Still another object of the invention is to provide a new and improved hand truck attachment which when in use on a truck acts structurally with the truck in the form of a triangular mounting and which is provided with an extra wheeled support on the attachment so that the truck, together with the attachment, can stand by itself on a rolling combination carriage.

Included also among the objects of the invention is the provision of certain adjustments for the attachment which permit members of the attachment to be shifted to a limited extent in different directions so that the correct angularity of the triangular support may be maintained and so that the attachment may be shifted to accommodate trucks having different widths.

Still further among the objects of the invention is to provide a new and improved adjusting column for a hand truck attachment which can be quickly and easily manipulated either before the truck is loaded or while the load is fully supported upon the truck.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a side elevational view of the truck equipped with the attachment in upright unloaded position.

Figure 2 is a rear view of the device of Figure 1 taken on the line 2—2.

Figure 3 is a longitudinal sectional view taken on the line 3—3 of Figure 2 showing the truck in partly tilted position.

Figure 4 is a side elevational view of the truck with the attachment shown in a lowered position.

Figure 5 is a cross-sectional view at one point of connection of the truck with the attachment taken on the line 5—5 of Figure 1.

Figure 6 is a fragmentary longitudinal sectional view of the adjusting column comprising a part of the attachment.

Figure 7 is a plan view partially in section taken on the line 7—7 of Figure 1.

This invention is an improvement upon the invention shown and described in our co-pending application, Serial No. 698,746, filed September 23, 1946.

In the embodiment chosen to illustrate the invention there is shown a hand truck 10 of substantially conventional design and construction which consists of a pair of side stays 11 or handles terminating in handle grips 12. The stays terminate at the opposite end in a toe piece 14 and are provided with a series of cross braces 15, 16, 17 and 18.

At the end of the truck body near the toe piece are elements 19 which may be considered as providing a chassis or carriage for a pair of wheels 20 supported upon an axle 21.

In the attachment comprising the subject matter of the invention there is shown a carriage extension 25 illustrated as comprising a relatively heavy metal strip, one end of which is provided with a clamping device for engagement with the axle 21 and the other end of which is provided with a swivel or caster wheel 26 secured to a bracket 27 by means of which the wheel is attached to the carriage extension.

The clamping device, as here shown, consists of a channel plate 28 having side elements 29 and an oppositely disposed plate 30 bolted to the channel plate by suitable bolts 31 by means of which the plates are securely fastened to the axle 21.

The side elements of the channel plate are adapted to mount pivot pins 32 here shown integral with the end of the carriage extension 25. It should be noted that the axis of the pivot pins for the position of the truck shown in Figure 1 is above the axle; whereas, when the truck body is tilted to the position shown in Figure 4, the axis of the pivot pins is shifted downwardly to a position approximately on the same level as the axle 21.

Joining the carriage extension with the truck body to form a triangular support is a column or brace 40 consisting of two telescoping parts 41 and 42, respectively. Details of the column may best be seen in Figure 6 wherein the part 42 is shown as received in the part 41 throughout a substantial portion of its length. As indicated, the part 42 is provided with a series of longitudinally spaced perforations 43. The part 41 is provided with a latch 44 having a turned-over end 45 adapted to penetrate an aperture 46 at the lower end of the part 41 and any one of the perforations 43 which may be desired. A bracket 47 supports the mid-portion of the latch, and a guide 48 surrounded by a coiled compression spring 49 serves to bias the latch normally into a position of engagement with the perforations.

The telescoping part 42 is ordinarily designed to be pivotally attached to the carriage extension 25. The means of attachment comprises a foot plate 50 having lugs 51 thereon, one on each side of the telescoping part, and a pin 52 extends through the lugs and the part so as to provide a pivot support.

The foot plate is here shown as being provided with a pair of parallel elongated slots 53 through which extend bolts 54 as a means for attaching the foot plate to the carriage extension. The carriage extension may be provided with two series of apertures 55 and 56, one series being located in advance of the other so as to provide a wide range of adjustment for the foot plate upon the carriage extension.

The telescoping part 41 is designed to be attached to the upper end of the truck body. Having in mind that truck bodies may vary considerably in width between the side stays, and handles, some means need be provided for spanning any one of several different widths so that the attachment may be sufficiently versatile.

In the embodiment illustrated there is provided a transverse channel element 60 having downwardly extending lugs 61 spanning the outer circumference of the telescoping part 41 and attached thereto by means of a pin 62. By this means of attachment the telescoping part 41 has a pivotal connection with the transverse channel element.

As best shown in Figure 5, the channel element has a length ordinarily somewhat less than the distance between the side stays 11. In order to reach the side stays there are provided channel extensions 63, one on each side, the flanges of which are adapted to be received within the flanges of the channel element 60, as is more readily apparent in Figures 1 and 3.

The outer end of each channel extension is adapted to be secured to the side stay by means of a bolt 64. For attaching the channel extension to the channel element a second bolt 65 is utilized. To provide a range of adjustment the aperture in the channel extension through which the bolt passes is made in the form of a longitudinally extending slot 66. By reason of the presence of the slot, the extension may be moved outwardly or inwardly throughout a distance determined by the length of the slot and thus enable the outer bolted end of the extension in each case to be located precisely at the side stay. By arranging the channel extension with the channel element in the manner shown, namely, by having the base portions of each oppositely disposed and the flange aligned side by side, a structure of greatly improved strength is made possible.

In operation, and particularly when heavy loads are encountered, the attachment is adjusted into either the position shown in Figure 1 or a position similar to that shown in Figure 3. If the adjustment of Figure 3 is to be employed, as is more frequently the case, the truck when tilted up to a position where the toe piece is level with the floor will cause the carriage extension to be raised, and the swivel wheel 26 would likewise be raised a few inches above the floor. The load is then shifted into position on the toe piece, and the operator by both standing upon the rear end of the carriage extension and pulling on the handle grips can use his weight advantageously to tilt the truck to the position shown in Figure 3.

When the load is very heavy the truck when loaded will stop when the wheel 26 comes into contact with the floor, and there will be no danger of the weight of the load tilting the truck too far into the hands of the operator. The telescoping parts forming the brace 40 will form a rigid column in order to firmly support that portion of the load applied to the upper end of the truck body. If the tilt of the truck for the load applied is not satisfactory in order to make manipulation of the loaded truck easy, the brace may be adjusted by releasing the latch 44 and shifting the handles up or down to a new position of adjustment.

In all positions, however, there will be a triangular support for the load which will greatly improve the handling of the truck and the safety of its operation. It will become apparent from the foregoing description that it is an element of importance to have the foot piece 50 adjustable within certain limits so that for heavy loads the brace 40 may assume a substantially vertical position at the angle of tilt of the body which will be most frequently used.

If the brace is to be adjusted so that the truck assumes the position of Figure 1 when a load is to be lifted it is necessary to release the latch 44 while pulling upon the handle grips 12 in order that the telescoping parts may slide together as the truck is being tilted. When the proper tilt has been reached it is necessary only to release the latch 44, and it will immediately engage the nearest adjacent aperture 43 as the parts continue to slide and will firmly hold that position. In that position, which will resemble in some respects the tilted position of Figure 3, the truck with its load may be pushed about in the manner of a cart.

On those occasions where it may be more advisable to lower the truck to the position shown in Figure 4, this may also be done by again releasing the latch 44 and permitting the body to tilt all the way down into the position there shown where the latch may engage the lowermost of the apertures 43. This will anchor the attachment in a position wherein the brace will be approximately parallel to the carriage extension 25.

So that this position of adjustment may be rigid to a sufficient extent, location of the end of the carriage extension which is attached to the axle 21 of the truck wheels plays an important part. By making this connection in the manner shown, the axis of the pins 32 will be at a substantial distance from the end of the truck body above the wheels so that a triangular relationship is maintained. In this instance, however, the carriage is effective in constituting one leg of the triangle.

The arrangement thus illustrated improves the rigidity of adjustment of the attachment in full lowered position of the truck and likewise improves the ease with which a loaded truck in the lowermost position may be elevated to one of the upward tilted positions. A certain mechanical advantage is maintained which is found particularly useful in handling loads on the truck.

In hand trucks provided with the attachment forming the subject matter of the invention described herein trucks may be utilized for loads up to the full weight for which the trucks are designed, and utilization of the trucks is made less dependent upon the skill and strength of the operator.

Hand trucks equipped with the attachment may be left standing with the load upon them and can be immediately shifted from one place to another without it being necessary for the operator to lift upon the handles to raise the truck into a wheeling position or to pull upon the handles in order to disengage the toe piece from the floor so that the truck can be wheeled about.

Utilization of the attachment, however, does not interfere in any way with the full advantages of a hand truck of this type which may be enjoyed when the attachment is not present inasmuch as the attachment may be folded against the back of the truck body in the position shown in Figure 4 and maintained in that position when the truck is tilted into an upward position where the swivel wheel 26 is no longer on the floor.

The attachment is sufficiently versatile so that it may be applied to practically any type of truck and also to any size of truck by reason of the presence of the adjustable features heretofore described.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. In a hand truck having a truck body, a handle device thereon, a chassis secured to and adapted to support the body and wheels on the chassis, the combination of an attachment comprising a carriage extension transverse to the wheel axis and rearward of said axis, a pivotal attachment between the chassis and one end of the extension and a supporting wheel at the other end of said extension, an adjustable, extensible brace pivotally secured to the extension, an upper rig having a permanent pivotal attachment to the upper end of the brace and adapted for attachment to the handle device, laterally extensible adjusting elements on the rig, and means for holding the brace in adjusted, extended and retracted position.

2. In a hand truck having a truck body, a handle device thereon, a chassis secured to and adapted to support the body and wheels on the chassis, the combination of an attachment comprising a carriage extension transverse to the wheel axis and rearward of said axis, a pivotal attachment between the chassis and one end of the extension and a supporting wheel at the other end of said extension, an adjustable, extensible brace, a lower foot piece pivotally fixed upon the brace and having a longitudinally adjustable connection to the extension, an upper rig pivotally fixed upon the brace and adapted for attachment to the handle device, laterally extensible adjusting elements on the rig, and means for holding the brace in adjusted, extended and retracted position, said fully extended position being one wherein the truck body may assume substantially a vertical position and said retracted position being one wherein the truck body is substantially horizontal with the wheels of the truck and carriage resting on the horizontal supporting surface.

3. In a hand truck having a truck body, a handle device thereon, a chassis adapted to support the body and wheels on the chassis, the combination of a self-contained attachment comprising a carriage extension member transverse to and rearward of the wheel axis, a pivotal attachment at one end of the extension member adapted to join said member to the chassis and a swivel wheel support at the other end, an adjustably extensible brace member, a pivotal connection at one end of the brace member to the last named end of the extension member, and a pivotally connected rig on the other end of the brace member and adapted for attachment to the truck body adjacent the handle device.

4. In a hand truck having a truck body, a handle device thereon, a chassis secured to and adapted to support the body and wheels on the chassis, the combination of a self-contained attachment comprising a carriage extension member transverse to and rearward of the wheel axis, a pivotal attachment at one end of the extension member adapted to join said member to the chassis and a swivel wheel support at the other end, an adjustably extensible brace member, a pivotal connection at one end of the brace member to the last named end of the extension member, and a pivotally connected rig at the other end of the brace member adapted to connect said brace to the handle device, said rig for connecting the brace member to the handle device comprising a member pivotally attached to the brace and having a laterally extensible flange member on said last identified member.

5. In a hand truck having a truck body, a handle device thereon, a chassis secured to and adapted to support the body and wheels on the chassis, the combination of an attachment comprising a carriage extension member transverse to and rearward of the wheel axis, a pivotal attachment at one end of the extension member adapted to join said member to the chassis and a wheel support at the other end, an adjustably extensible brace member, a pivotal connection at one end of the brace member to the last named end of the extension member, a connection between the other end of the brace member and the handle device, said last identified connection comprising one flanged member pivotally secured to the brace member, another flanged member on said one flanged member adapted to be secured to the handle, said other flanged member comprising separate elements on opposite ends of said one flanged member, one of said flanged members having elongated slots and the other of said flanged members having bolts fixed in positions opposite said slots and protruding therethrough.

6. In a hand truck having a truck body, a handle member therefor, a chassis adapted to support the body and wheels on the chassis, the combination of a self-contained attachment comprising a carriage extension member transverse to and rearward of the wheel axis, a pivotal attachment at one end of the extension member adapted to join said extension member to the chassis and a wheel support at the other end, an adjustably extensible brace member, a connection at one end of the brace member to the last named end of the extension member, and a connection between the other end of the brace member and the handle member, said brace member comprising telescoping parts having at the outside ends thereof pivoted plates adapted for exclusive pivotal attachment respectively to the handle member and the extension member, and means for holding said telescoping parts in any one of several positions of adjustment comprising a series of longitudinally spaced perforations in one part and a latch on the other part having an end thereof extending through said last part adapted normally to be spring pressed into engagement at said end with one of said perforations.

BENJAMIN HOOZ.
SAMUEL T. MELLO.

REFERENCES CITED

The following references are of record in the file of this patent:

UNITED STATES PATENTS

| Number | Name | Date |
|---|---|---|
| 627,284 | Walker | June 20, 1899 |
| 978,344 | Wirt | Dec. 13, 1910 |
| 1,964,119 | Hendry | June 26, 1934 |
| 2,030,925 | Lea | Feb. 18, 1936 |
| 2,040,134 | Heller | May 12, 1936 |
| 2,132,069 | Hall | Oct. 4, 1938 |
| 2,287,314 | Kroll et al. | June 23, 1942 |
| 2,398,584 | Goodrich | Apr. 16, 1946 |

FOREIGN PATENTS

| Number | Country | Date |
|---|---|---|
| 329,933 | Germany | Dec. 1, 1920 |
| 617,947 | France | Nov. 30, 1926 |